(12) United States Patent
Nyssen

(10) Patent No.: US 7,597,832 B2
(45) Date of Patent: Oct. 6, 2009

(54) METHOD FOR THE PRODUCTION OF PLASTIC SKINS BY POWDER SINTERING AND CORRESPONDING SINTERING TOOL

(75) Inventor: Siegfried Nyssen, Strauding (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 695 days.

(21) Appl. No.: 10/549,512

(22) PCT Filed: Mar. 12, 2004

(86) PCT No.: PCT/EP2004/002603

§ 371 (c)(1),
(2), (4) Date: Sep. 20, 2005

(87) PCT Pub. No.: WO2004/082917

PCT Pub. Date: Sep. 30, 2004

(65) Prior Publication Data

US 2006/0208389 A1      Sep. 21, 2006

(30) Foreign Application Priority Data

Mar. 21, 2003   (DE)   ................ 103 13 811

(51) Int. Cl.
*B29C 41/18*      (2006.01)
(52) U.S. Cl. ................. 264/246; 264/255; 264/302; 425/112; 425/130; 425/435
(58) Field of Classification Search ........... 425/112, 425/130, 435; 264/246, 255, 264, 302
See application file for complete search history.

(56) References Cited

U.S. PATENT DOCUMENTS 5,225,261 A    7/1993   Kargarzadeh (Continued)

FOREIGN PATENT DOCUMENTS

EP         339222      * 11/1989

(Continued)

OTHER PUBLICATIONS

Patent Abstracts of Japan vol. 2000, No. 07, Sep. 29, 2000.

(Continued)

*Primary Examiner*—James Mackey
(74) *Attorney, Agent, or Firm*—Millen, White, Zelano, Branigan, P.C.

(57) ABSTRACT

The invention relates to a method for the production of plastic skins by pulverizing, wherein a powder is placed on a forming tool and a plastic skin is formed by sintering. A partial area of the forming tool, at least during a first pulverization step, is made inaccessible to the powder by means of a mask with a preferably inflatable sealing edge. The forming tool is provided with a separating web along one edge of the partial area whereon the mask rests during the first pulverization step with the sealing edge. The invention also relates to a corresponding sintering tool and a plastic part which comprises a plastic skin produced according to inventive method of production, on one surface thereof. The inventive method can produce two-color plastic skins, which are usually used as surface decorations, while effectively avoiding scrap.

26 Claims, 1 Drawing Sheet

U.S. PATENT DOCUMENTS

Figure 1A:
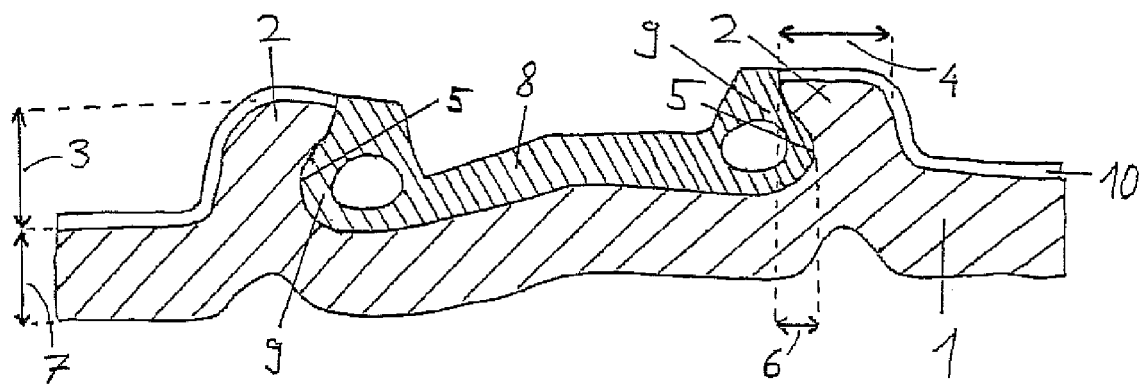

| | | | |
|---|---|---|---|
| 5,234,653 A * | 8/1993 | Buzzoni et al. | 264/302 |
| 5,863,064 A * | 1/1999 | Rheinlander et al. | 280/732 |
| 6,280,666 B1 | 8/2001 | Gallagher et al. | |
| 6,524,509 B1 | 2/2003 | Gray et al. | |

FOREIGN PATENT DOCUMENTS

| | | | |
|---|---|---|---|
| EP | 0 367 636 A | | 5/1990 |
| EP | 972625 | * | 1/2000 |
| JP | 59-159309 | * | 9/1984 |
| JP | 63 172618 A | | 7/1988 |
| JP | 03 055219 | | 3/1991 |
| JP | 04 235008 A | | 8/1992 |
| JP | 10 095250 A | | 4/1998 |
| JP | 2000 108148 A | | 4/2000 |
| WO | WO 2004/082917 A1 | | 9/2004 |

OTHER PUBLICATIONS

Patent Abstracts of Japan vol. 1998, No. 09, Jul. 31, 1998.
Patent Abstracts of Japan vol. 012, No. 437, Nov. 17, 1988.
Patent Abstracts of Japan vol. 017, No. 002, Jan. 5, 1993.
Patent Abstracts of Japan vol. 015, No. 203, May 24, 1991.
Austin M. Patterson, German-English Dictionary for Chemists, Fourth Edition, p. 655 (1992).

* cited by examiner

METHOD FOR THE PRODUCTION OF PLASTIC SKINS BY POWDER SINTERING AND CORRESPONDING SINTERING TOOL

The invention relates to a method for the production of plastic skins by powder sintering, in which powder is applied to a forming tool where it forms a plastic skin by sintering, a partial area of the forming tool being made inaccessible for the powder by means of a sealing device, at least in a first pulverization step. The invention also relates to a corresponding sintering tool for producing plastic skins by powder sintering, which has a forming tool with a surface for receiving a plastic skin being produced and which has a sealing device for separating a partial area of the surface, as well as to a plastic part which has on one surface a plastic skin produced using the inventive production method.

Production methods of this type serve to produce generally soft plastic skins which can be used as surface decorations for moulded plastic parts, such as automotive vehicle interior trims for example, especially instrument panels. In order to form such a moulded plastic part, such plastic skins can be back-sprayed or back-foamed and possibly in this process be connected to a support as an additional component. In conventional powder sintering methods, a forming tool which has a shape which corresponds to a desired shape for the plastic skin or for a corresponding moulded plastic part is brought by heating to a temperature which lies above the melting point of the plastics material used, and placed on a powder box which contains the plastics material in the form of powder. Then the powder box and the forming tool can be so rotated that the powder falls into the forming tool, where it forms the plastic skin by sintering, possibly after the described steps have been repeated a number of times. Non-melted powder residues can in each case fall back into the powder box after a further rotation of the powder box and forming tool.

In more recent applications of plastic skins as surface decorations, surface properties which differ in areas are desired, especially the demarcation of partial areas by a different colour. In order to achieve this with a powder sintering method of the described type, there is a known way of making one partial area of the forming tool inaccessible for the powder during a first pulverisation step, such that a first plastics material layer is produced which leaves out this partial area, and then following this with a second pulverisation step using a different plastics material, in which the partial area is also pulverised and a second plastics material layer is produced which has the desired surface properties different from those of the first plastics material layer. Leaving out the partial layer during the first pulverisation step is achieved in corresponding production methods according to the prior art in that a possibly inflatable seal is pressed along a separating line delimiting the partial area, onto the forming tool or onto a separating web arranged along the separating line on the forming tool. For this purpose, these seals are arranged on an edge of an additional wall of the powder box, by which means the surface of the forming tool which receives the plastic skin being produced is subdivided into different areas. For the first pulverisation step, then at least one of the areas is kept free of powder; for the second pulverisation step generally a different powder box is used which then does not have to have any such seal.

The described production method entails various disadvantages. It requires a powder box which is designed in an extremely expensive way and has at least one additional wall and a seal placed on it for which very narrow geometric tolerances must be observed, in order to achieve effective covering of the partial area of the forming tool. Even in a high-precision tool, sealing defects can practically not be excluded, for example due to a forming tool being not placed quite exactly onto the powder box, which can lead to powder displacements in the first pulverisation step. Even with separating lines of simple geometry, a production of scrap is thus practically unavoidable. A production method according to the prior art becomes very problematic as soon as a separating line between surface areas having different properties is intended to follow a three-dimensional contour. Even slight curvatures such as can be present for example on the scoops of instrument panels, lead to a scrap production of roughly 20%.

The object underlying the invention, therefore, is to develop a production method of this type and a corresponding sintering tool, by means of which the mentioned disadvantages can be avoided. In particular, a reliable separation of a partial area of the forming tool in as simple a manner as possible, preventing powder displacement, should be possible for a first pulverisation step even in the case of more complicated surface geometries of the forming tool and three-dimensional courses of an edge of the partial area.

This object is accomplished according to the invention by a production method of plastic skins by powder sintering, in which powder is applied to a forming tool where it forms a plastic skin by sintering, a partial area of the forming tool being made inaccessible for the powder by means of a sealing device, at least in a first pulverization step, characterized in that the forming tool has a separating web along an edge of the partial area and in that a mask having a preferably inflatable sealing edge serves as a sealing device, the mask abutting with the sealing edge against the separating web during the first pulverization step and being secured solely to the forming tool. This object is also accomplished according to the invention by a sintering tool for producing plastic skins by powder sintering, which has a forming tool with a surface for receiving a plastic skin being produced and which has a sealing device for separating a partial area of the surface, characterized in that the forming tool has a separating web on the surface along an edge of the partial area, and in that the sealing device is designed as a mask having a preferably inflatable sealing edge, which is to be secured to the surface in such a way that the partial area is covered by the mask and the sealing edge abuts against the separating web. Advantageous embodiments of the invention arise with the features further described below.

Due to the separating web extending along a generally enclosed edge of the partial area, it becomes possible to cover the partial area for the first pulverization step with a mask which is solely secured to the forming tool. The mask, which does not necessarily have to follow exactly each surface contour of the forming tool, is for this purpose clamped to the forming tool with its sealing edge, preferably an inflatable bead, abutting against the boundary web, such that the mask is held by the separating web. Thus an extremely effective sealing of the partial area is achieved with a very simple sintering tool. In particular, a simple powder box without additional features can be used. Without great outlay and with greatly reduced effects of tolerance-related deviations by comparison with the prior art, due to the effective sealing powder displacement into the partial area is reliably avoided during the first pulverization step, even if the edge of the partial area follows a three-dimensional contour. If the first pulverization step is followed, after removal of the mask, by a further pulverization step using a different plastics material, differing for example in color or mechanical properties, plastic skins can be produced, effectively avoiding scrap, which in a partial area have correspondingly differing properties, and in comparison with the prior art, more general courses of separating lines between areas of different color or any other properties are possible. Here a single production step, described as a pulverization step, can include the application of powder to the heated forming tool, melting-on and removal of excess powder, also in a multiple sequence, for example by repeated rotation of powder box and forming tool.

In comparison with the production of two-coloured plastic parts or those which have areas differing in some other surface properties and which are formed from a plurality of parts put together, the use of a plastic skin produced using the described production method and having differing surface properties in at least one partial area, has the advantage that a one-part embodiment is possible, thus eliminating a cause of undesired rattling or squeaking. In comparison with other possible ways of producing plastic parts with two-coloured soft surfaces, such as by partial painting of the surface or by welding two single-coloured plastic skin parts, the invention has the advantage of a considerably reduced outlay.

Apart from the production of two-coloured plastic skins or plastic skins which have some other differing properties in certain areas, the described method is also advantageous for producing plastic skins with recesses. Compared with subsequent cutting-out or stamping-out of a partial area to be recessed, with the production method described here quite considerable amounts of material can be saved in such a case.

What is proposed therefore is an advantageous method for the production of plastic skins by powder sintering, in which powder is applied to a forming tool, where it forms a plastic skin by sintering, a partial area of the forming tool being made inaccessible for the powder at least during a first pulverisation step by a sealing device, and the sealing device embodied as a mask being laid for the first pulverisation step with a preferably inflatable sealing edge against a separating web extending along an edge of the partial area, the mask being thus secured solely to the forming tool in typical embodiments of the invention. The application of the powder to the forming tool can take place by rotating the forming tool—typically together with a powder box—exploiting gravity and/or a centrifugal force.

Even more secure attachment of the mask to the forming tool can be achieved in the described production method if the separating web is undercut so that it forms through an overhang to the partial area a groove open in that direction. For attaching the mask to the forming tool, the sealing edge can then be introduced into this groove so that in the groove it abuts against the separating web and the mask is prevented from sliding out by this form-fit connection.

Particularly suitable as material for the mask is silicone, the elastic properties of which facilitate securing the mask to the forming tool, and which permits very good sealing of the partial area particularly if the mask has an inflatable sealing edge. For inflating the sealing edge, the mask can have a preferably separable supply line for compressed air or the like.

The sealing edge of the mask may consist of silicone or a duroplastic elastomer.

The forming tool, which due to a corresponding three-dimensional contouring of a surface receiving the produced plastic skin, permits the production of a plastic skin which is suitably pre-shaped for later use as surface decoration for a moulded part, with possibly a separating line which, depending on the selected course of the separating web, also follows a three-dimensional contour, between surface areas of differing properties, can have a shell for receiving the plastic skin being produced, which shell predetermines the contour and has a wall thickness of between 2 mm and 6 mm. With a wall thickness of the shell of between 2 mm and 4 mm, a particularly good compromise is achieved between sufficiently high stability and simultaneously not too high heating capacity, whereby heating and cooling for pulverisation, sintering and subsequent curing is made possible with low outlay.

The forming tool or the shell described in the previous paragraph can be produced from nickel, a material which is particularly suitable for this purpose because it permits easy detachment of the finished plastic skin from the forming tool, avoiding damage. Advantageous furthermore, in addition to the good thermal conductivity of nickel, is also the possibility of particularly simple production of an appropriate forming tool. Such a nickel shell can be produced on a deposition mould for example by electrodeposition or by nickel vapour deposition. The separating web on the forming tool can also be very simply realised, for example by introducing a finished nickel web profile into the deposition mould in such a way that nickel being deposited grows on the web profile, the web profile forming the separating web of the finished sintering tool. Another possibility is welding the nickel separating web onto a web stump which has been ground flat. Other metals which have similar properties, such as copper for example, can also be considered for the forming tool, in other production methods for the forming tool also as alloys.

An expedient further development of the described sintering tool provides for the forming tool to be double-walled, i.e. to have, for example, two similarly shaped shells at a small spacing from each other. A cavity thus produced between the two shells can serve to guide a heating medium, by which means the necessary heating of the forming tool for sintering can be very practically achieved, for which purpose expensive additional method steps would otherwise be required, such as for example the introduction of the forming tool into a furnace. Oil is for example suitable as a heating medium. For cooling the forming tool after pulverisation in order to cure the plastic skin, cold oil or some other preferably fluid and corrosion-avoiding substance can serve in the same way as the coolant.

The forming tool is expediently combined with a powder box onto which the forming tool can be placed as tightly as possible. To simplify the described production method, the sintering tool can be mounted so as to be rotatable about a horizontal axis, for example by arranging the forming tool in a rotating frame.

If the surface of the forming tool which receives the plastic skin as it is being produced is designed with differing graining inside and outside the partial area, with the described production method plastic skins can be produced which differ in sharply defined areas not only in their colour or other material properties, such as haptic properties for example, but which also have differing surface graining in these areas. An effect dividing the surface of a plastic part into different areas can thus be further intensified. Naturally the case is also possible that the forming tool is grained only inside or only outside the partial area; then plastic skins which are grained in some areas and smooth in other areas are obtained.

In order to guarantee secure attachment of the mask and thus good coverage of the partial area for the first pulverisation step, the separating web is preferably to be designed with a height of between 2 mm and 7 mm. Too high a separating web should be avoided so that no too great material excess is produced at the separating line of the finished plastic skin.

Particularly good results are achieved with a height of the separating web of between 3 mm and 5 mm. The groove formed by an undercut separating web can have a depth of between 0.2 mm and 2 mm, preferably between 0.3 mm and 1 mm, for secure clamping of the mask, so that in a further pulverisation step without the mask, for producing a gap-free plastic skin, the groove is also reached by the powder. For as sharp as possible a separating line between the various areas of the plastic skin being produced, the separating web should not be too wide. A separating web which is still sufficiently stable can have a width of between 1 mm and 6 mm, preferably between 2 mm and 4 mm.

The sealing edge of the mask is advantageously to be of dimensions corresponding to the separating web. In the inflated state, the sealing edge can have for example a diameter of between 5 mm and 20 mm, preferably between 10 mm and 15 mm. In other areas, on the other hand, the mask can also have a lower thickness, however care should be taken to ensure that powder falling onto the mask does not melt there, which can be prevented by a mask which is in turn not too thin. To avoid sintering of the powder falling onto the mask, arranging a thermal shield on the mask is also possible; with this a thickness of the mask of up to 20 mm is expedient.

For example, the mask can have a thickness of between 1 mm and 6 mm, preferably between 2 mm and 4 mm and/or the sealing edge, when inflated, can have a thickness of between 5 mm and 20 mm, preferably between 10 mm and 15 mm.

For forming a plastic part, for example an instrument panel or some other interior trim part for automotive vehicles, with a plastic skin, produced using the described production method, as surface decoration, the plastic skin can be back-foamed. Thermoplastic polyurethane is particularly suitable as the back-foaming compound. During the back-foaming, the plastic skin can be connected to a support, usually a plastics material support, which is foamed round or on in the same working step, this support providing the plastic part with increased stability and bearing capacity. A foam layer thus produced behind the plastic skin preferably has a thickness of between 3 mm and 10 mm; thus plastic parts can be realised which are neither too heavy nor too sensitive.

Figure 1B:
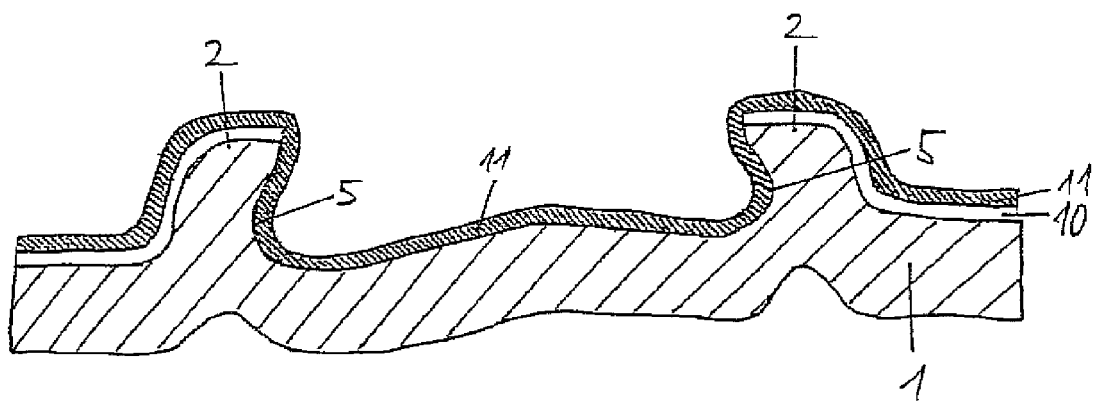
Figure 2:
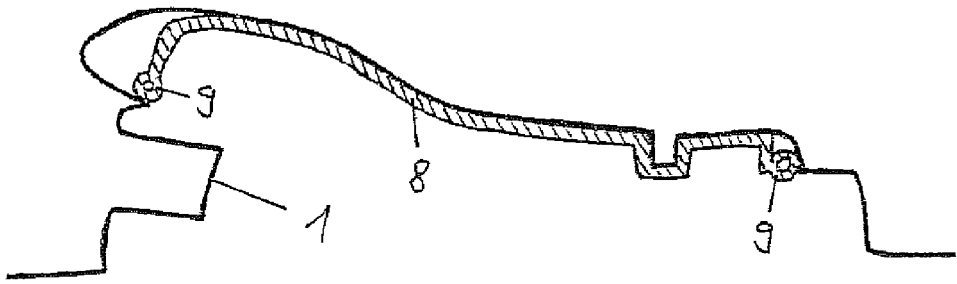

The invention is explained with the aid of embodiments depicted in FIGS. 1A, 1B, and 2, wherein:

FIGS. 1A and 1B show two successive method steps of a production method according to the invention, a sintering tool and a plastic skin being produced being shown in cross-section, and FIG. 2 shows, also in cross-section, a sintering tool for producing a plastic skin for trimming an instrument panel In FIG. 1A can be recognized a forming tool 1, which has an undercut separating web 2, the separating web 2 forming a closed boundary of a partial area on the forming tool 1. The separating web 2 has a height 3 of roughly 4 mm, a width 4 of roughly 3 mm and, through an overhang towards the partial area, forms a groove 5 having a depth 6 of approximately 0.5 mm. The forming tool 1 itself, of which only a detail can be seen in the figure, consists of nickel and has a wall thickness 7 of approximately 3 mm. The forming tool 1 forms overall a shell-like open shape with a surface contour which corresponds to a desired contour for a plastic skin to be produced. Important for this normally is a surface contour predetermined by a moulded plastic part for which the plastic skin is intended to serve as surface decoration. The separating web 2 can also have a course which follows a three-dimensional contour, in the depicted cross-sections substantially perpendicular to the plane of the drawing.

For the method step depicted in FIG. 1A, a silicone mask 8 having an inflatable sealing edge 9 is so secured to the forming tool 1 that the mask 8 covers the partial area which is surrounded by the separating web 2. The mask 8 is here solely secured to the forming tool 1, and for this purpose clamped with the sealing edge 9 in the groove 5. By inflating the sealing edge 9, which thus attains a diameter of roughly 10 mm, secure attachment of the mask 8 to the forming tool 1 is obtained as well as a good seal between the sealing edge 9 and the groove 5 or the separating web 2 respectively. The mask 8, which has a shape corresponding to the partial area, has a thickness of roughly 3 mm apart from the thicker sealing edge.

Through the production method, two steps of which are illustrated in FIGS. 1A and 1B, a plastic skin can be produced which has in a partial area a different color from that outside the partial area or which also differs in respect of other properties such as, for example, haptic properties inside the partial area. For this purpose, the mask 8 is secured to the forming tool 1 for a first pulverization step, as is depicted in FIG. 1A. After heating the forming tool 1 to a temperature of roughly 250° C., for example by blowing through hot air at a temperature of roughly 400° C., the forming tool 1 is placed with the mask 8 onto a powder box which is not shown in the figure. The powder box contains plastics material for the first pulverization step in powder form, the melting point of this plastics material lying below the temperature of the heated forming tool 1. By rotating the powder box, with the forming tool 1 placed on it, by roughly 180° about a horizontal axis, around which the sintering tool is rotatably mounted for this purpose, the powder is made to fall onto the forming tool 1, where it forms by sintering a first plastics material layer 10 as a result of the high temperature of the forming tool 1. The partial area covered by the mask 8 remains free of plastics material during this process. After a further rotation by roughly 180°, excess powder falls back into the powder box. Repeating the described steps possibly once or a number of times gives the first plastics material layer 10 a desired thickness. The method step depicted in FIG. 1A shows the forming tool 1, the mask 8 and the first plastics material layer 10 after the steps described so far.

Then the mask 8 is removed, to which end the sealing edge 9 can be emptied. A second pulverization step follows which resembles the just-described first pulverization step, but in which some other plastics material is used which differs, for example in color, from the plastics material used for the first pulverization step. As the mask 8 is now absent, the initially covered partial area on the forming tool 1 is also reached by the powder. For the second pulverization step, a different powder box can expediently be used which is similar to the powder box used first but contains powder of a different plastics material. During the second pulverization step, a second plastics material layer 11 is produced which becomes connected to the first plastics material layer 10 outside the partial area, but inside the partial area forms a single layer. The method step shown in FIG. 1B shows the forming tool 1, the first plastics material layer 10 and the second plastics material layer 11 at this point in time. The first plastics material layer 10 and the second plastics material layer 11 together form a plastic skin which, preferably after cooling of the forming tool 1, can be removed from the forming tool 1. Due to the covering of the partial area in a first pulverization step, the finished plastic skin has a two-colored surface structure or a surface which differs in some other properties in at least one partial area. If the forming tool 1 has a differently grained surface inside or outside the partial area, a further contrast between different areas on the plastic skin can be realized by differing graining.

A method related to the production method described with the aid of FIGS. 1A and 1B is obtained if the second pulverization step is omitted. A plastic skin is then obtained which has a corresponding recess in the partial area. Corresponding plastic skins can be used for example as decorations for interior trim parts which are intended to leave an area free. By using the production method hereby described, subsequent cutting-out or stamping-out of the recess becomes superfluous in this case and in this way unnecessary material losses can be avoided with at least a considerable reduction of an otherwise unavoidably large volume of stamping waste.

To produce a moulded plastic part having a plastic skin, produced as described, as the surface decoration, the plastic skin can for example be back-foamed with polyurethane, expediently with simultaneous foaming round of a plastics material support. Due to the described production method, the finished moulded plastic part can then have a surface which is, for example, two-coloured with a separating line between areas of differing colour which, if this is desired, can also without any problem have a complicated geometry and especially a geometry following a three-dimensional contour.

In FIG. 2 is shown in cross-section a complete forming tool 1 having a mask 2 placed on it for a first pulverisation step. The forming tool 1 and the mask 2 are constituent parts of a sintering tool for producing a plastic skin which is intended to serve as surface decoration for the trim for an instrument panel. The plastic skin obtains through a method of the above-described type a different colour in an area covered by the mask from that outside this area. In this figure can also be seen an inflatable sealing edge 9 of the mask 2, which is produced from silicone as in the previously described case. As the figure shows, the mask, when it is secured to the forming tool 1, does not necessarily have to follow every contour of the forming tool 1. The mask 2 is again secured to the forming tool 1 by being clamped into a groove 5, which is not visible here and which is formed by an undercut separating web 2, also not recognisable here. The forming tool 1, a nickel mould produced by an electroforming method in a galvanic shell and having a wall thickness of roughly 3 mm, has a shape which corresponds approximately to a finished trim for an instrument panel. The depicted cross-section would correspond in the finished automotive vehicle to a plane standing perpendicular to the direction of travel in the region of a scoop lying on the left in the figure and serving to cover instruments.

The invention claimed is:

1. A method for the production of plastic skins by powder sintering, comprising:
   applying a powder to a forming tool, and
   sintering said powder to form a plastic skin in a first pulverization step,
   wherein
   a partial area of said forming tool is made inaccessible to the powder by means of a sealing device,
   said forming tool has a separating web along an edge of said partial area, and
   said sealing device is a mask having an inflatable sealing edge, said mask abutting with said sealing edge against said separating web during said first pulverization step and being secured solely to said forming tool.

2. A method according to claim 1, wherein said first pulverization step is followed by at least one additional pulverization step, and said mask is removed for said additional pulverization step.

3. A method according to claim 1, wherein said separating web is undercut and thus forms a groove which is open towards the partial area and in which the sealing edge comes to rest during the first pulverization step.

4. A method according to claim 1, wherein at least a surface of said forming tool which receives the plastic skin being produced is made of nickel.

5. A method according to claim 1, wherein said sealing edge of the mask is made of silicone or a duroplastic elastomer.

6. A method according to claim 1, wherein said plastic skin is provided with areas of differing graining due to the different graining of a surface of the forming tool receiving the plastic skin being produced, inside and outside the partial area.

7. A method according to claim 1, wherein, due to a three-dimensional contour of a surface of the forming tool receiving the plastic skin during the powder sintering, said plastic skin obtains a correspondingly three-dimensional contour, and a separating line having a correspondingly three-dimensional course is produced on the plastic skin between surface areas of differing color and/or graining.

8. A sintering tool for producing plastic skins by powder sintering, comprising:
   a forming tool with a surface for receiving a plastic skin, and
   a sealing device for separating a partial area of said surface,
   the forming tool having a separating web on said surface along an edge of said partial area, and
   the sealing device is a mask having an inflatable sealing edge, which is to be secured to said surface in such a way that the partial area is covered by the mask and the sealing edge abuts against the separating web.

9. A sintering tool according to claim 8, wherein, when the mask is secured to the surface, the mask is solely secured to the forming tool.

10. A sintering tool according to claim 8, wherein said separating web is undercut and forms a groove which is open towards the partial area and in which the mask, when secured, abuts with the sealing edge against the separating web.

11. A sintering tool according to claim 8, wherein said forming tool has a shell with a wall thickness of between 2 mm and 6 mm for receiving the plastic skin being produced.

12. A sintering tool according to claim 8, wherein said forming tool is double-walled for guiding a liquid heating medium and/or coolant in a cavity between two walls.

13. A sintering tool according to claim 8, wherein said tool has at least one powder box on which the forming tool may be placed, the sintering tool being mounted so as to be rotatable about a horizontal axis.

14. A sintering tool according to claim 8, wherein at least said surface of said forming tool is made of nickel.

15. A sintering tool according to claim 8, wherein said sealing edge of the mask is made of silicone or a duroplastic elastomer.

16. A sintering tool according to claim 8, wherein said mask has a thickness of between 1 mm and 6 mm, and/or the sealing edge, when inflated, has a thickness of between 5 mm and 20 mm.

17. A sintering tool according to claim 8, wherein said separating web has a height of between 2 mm and 7 mm, and/or a width of between 1 mm and 6 mm.

18. A sintering tool according to claim 10, wherein said groove has a depth of between 0.2 mm and 2 mm.

19. A sintering tool according to claim 8, wherein said surface has differing graining inside and outside the partial area.

20. A sintering tool according to claim 8, wherein said surface has a three-dimensional contour.

21. A sintering tool according to claim 8, wherein said separating web has a three-dimensional course.

22. A method according to claim 2, wherein said at least one additional pulverization step produces a plastics material layer which is of a different color from the plastic skin produced in said first pulverization step.

23. A sintering tool according to claim 11, wherein said forming tool has a shell with a wall thickness of between 2 mm and 4 mm, for receiving the plastic skin being produced.

24. A sintering tool according to claim 16, wherein said mask has a thickness of between 2 mm and 4 mm and/or the sealing edge, when inflated, has a thickness of between 10 mm and 15 mm.

25. A sintering tool according to claim 17, wherein said separating web has a height of between 3 mm and 5 mm and/or a width of between 2 mm and 4 mm.

26. A sintering tool according to claim 18, wherein said groove has a depth of between 0.3 mm and 1 mm.

* * * * *

UNITED STATES PATENT AND TRADEMARK OFFICE
CERTIFICATE OF CORRECTION

PATENT NO. : 7,597,832 B2  
APPLICATION NO. : 10/549512  
DATED : October 6, 2009  
INVENTOR(S) : Siegfried Nyssen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Twenty-eighth Day of September, 2010

David J. Kappos  
*Director of the United States Patent and Trademark Office*